US012789405B2

(12) United States Patent
Garaew

(10) Patent No.: US 12,789,405 B2
(45) Date of Patent: Nov. 10, 2026

(54) PRODUCT CONVEYOR DEVICE FOR SUPPLYING FOOD PRODUCTS TO A SLICING UNIT

(71) Applicant: WEBER FOOD TECHNOLOGY GMBH, Breidenbach (DE)

(72) Inventor: Sergej Garaew, Siegen (DE)

(73) Assignee: WEBER FOOD TECHNOLOGY SE & CO. KG, Breidenbach (DE)

( * ) Notice: Subject to any disclaimer, the term of this patent is extended or adjusted under 35 U.S.C. 154(b) by 289 days.

(21) Appl. No.: 18/698,573

(22) PCT Filed: Oct. 4, 2022

(86) PCT No.: PCT/EP2022/077609
§ 371 (c)(1),
(2) Date: Apr. 4, 2024

(87) PCT Pub. No.: WO2023/057465
PCT Pub. Date: Apr. 13, 2023

(65) Prior Publication Data

US 2024/0399605 A1 Dec. 5, 2024

(30) Foreign Application Priority Data

Oct. 5, 2021 (EP) .................................... 21200955

(51) Int. Cl.
*B26D 7/06* (2006.01)
*B65G 15/10* (2006.01)

(52) U.S. Cl.
CPC ........... *B26D 7/0625* (2013.01); *B65G 15/10* (2013.01); *B26D 2210/02* (2013.01); *B65G 2201/0202* (2013.01)

(58) Field of Classification Search
CPC .. Y10S 83/932; Y10T 83/647; Y10T 83/6476; Y10T 83/648; Y10T 83/2092;
(Continued)

(56) References Cited

U.S. PATENT DOCUMENTS 9,457,487 B2 * 10/2016 Mayer .................. B26D 7/0625
10,988,319 B2 4/2021 Wilkins et al.
(Continued)

FOREIGN PATENT DOCUMENTS

EP 1816092 B1 3/2011
EP 2783819 B1 3/2016
(Continued)

OTHER PUBLICATIONS

PCT Patent Application PCT/EP2022/077609 International Preliminary Report on Patentability issued Apr. 11, 2024.
(Continued)

*Primary Examiner* — Phong H Nguyen
(74) *Attorney, Agent, or Firm* — Erise IP, P.A.

(57) ABSTRACT

A product conveying apparatus for feeding food products to a slicing unit of a food slicing machine is disclosed. The product conveying apparatus may comprise a first conveying lane comprising a first deflection roller, a first drive roller, and a first circulating conveying device guided around the first deflection roller and the first drive roller and presenting a first conveying surface. A second conveying lane may comprise a second deflection roller and an additional deflection roller, a second drive roller, and a second circulating conveying device guided around the second deflection roller, the additional deflection roller, and the second drive roller and presenting a second conveying surface.

14 Claims, 3 Drawing Sheets

(58) Field of Classification Search
CPC ............. Y10T 83/2098; Y10T 83/2192; Y10T 83/0462; Y10T 83/0467; B26D 7/0625; B26D 2210/02; B65G 15/10; B65G 15/12; B65G 15/14; B65G 15/16; B65G 2201/0202
USPC ................................ 198/461.1, 461.3, 459.8
See application file for complete search history.

(56) References Cited

U.S. PATENT DOCUMENTS

| | | | | |
|---|---|---|---|---|
| 2007/0187211 | A1* | 8/2007 | Vertogen | B65G 47/31 198/461.1 |
| 2010/0307304 | A1* | 12/2010 | Weber | B26D 7/225 83/403.1 |
| 2019/0359428 | A1* | 11/2019 | Specht | B65G 23/24 |

FOREIGN PATENT DOCUMENTS

| | | | |
|---|---|---|---|
| EP | 3308915 | B1 | 9/2021 |
| WO | 2009115988 | A1 | 9/2009 |

OTHER PUBLICATIONS

PCT Application No. PCT/EP2022/077609 International Search Report and Written Opinion Jan. 2, 2023.

* cited by examiner

PRODUCT CONVEYOR DEVICE FOR SUPPLYING FOOD PRODUCTS TO A SLICING UNIT

RELATED APPLICATION

The present application is a national stage application under 35 U.S.C. § 371 of International Application No. PCT/EP2022/077609, filed 4 Oct. 2022, which claims priority from European Patent Application No. 21200955.9, filed 5 Oct. 2021. The above-referenced applications are incorporated by reference.

BACKGROUND

The present invention relates to a product conveying apparatus for feeding food products to a slicing unit of a food slicing machine, to a food slicing machine with a belt cartridge receptacle, and to a method for removing a belt cartridge from a food slicing machine.

Food products, for example, sausage, cheese or bread, often have the shape of elongated food bars and are fed to a slicing unit, for example, with a circulating sickle or circular knife, in a food slicing machine, which can be a high-performance slicer. For this purpose, one or more product conveying apparatuses are provided in a feed region and are in contact with the food bar for moving it to a cutting plane of the slicing unit. The product conveying apparatus can be configured as a lower product support on which the food bar rests, or as an upper product hold-down device which presses onto the food bar from above. The product conveying apparatus usually extends up to a cutting edge of the slicing unit and contributes to precise product advancement. The product conveying apparatus can be configured with two or more parallel transport lanes for processing several food products side by side. For this purpose, the individual transport lanes can be drivable separately from one another, and it is known to drive inner conveying lanes with drive shafts running through hollow shafts. As is known, for example, for product hold-down devices, the conveyor belts of all transport lanes can furthermore be deflected to drive rollers disposed outside the conveying plane, where the driven drive rollers are then arranged offset from one another.

The known variants for driving the lanes of a product conveying apparatus are technically complex, have disadvantages in terms of mechanical mounting, or take up a relatively large space.

SUMMARY

The object of the invention is to provide an alternative multi-lane product conveying apparatus.

A product conveying apparatus according to the invention for feeding food products to a slicing unit of a food slicing machine comprises a first conveying lane and a second conveying lane. The first conveying lane comprises a first deflection roller, a first drive roller, and a first circulating conveying device. The first circulating conveying device is guided around the first deflection roller and the first drive roller such that a first span extending from the first deflection roller to the first drive roller forms a first conveying surface, where the first drive roller is drivable about a first axis. The second conveying lane comprises a second deflection roller, a second drive roller, a second circulating conveying device and an additional deflection roller. The second circulating conveying device is guided around the second deflection roller, the second drive roller and the additional deflection roller such that a second span extending from the second deflection roller to the additional deflection roller forms a second conveying surface, where the second drive roller is drivable about a second axis.

This results in a simple, compact and stable structure for a two-lane or multi-lane conveying apparatus. The slicing unit comprises in particular a cutting knife which is rotated by a cutting knife drive relative to a cutting edge.

Preferably, the first conveying surface and the second conveying surface are coplanar. This means that two food products can be fed to a slicing unit next to each other and at the same height. If the cutting blade is of the appropriate size, the same machine settings can be performed for both conveying surfaces and thereby for both food products. It is also possible to place a single food product with correspondingly large dimensions on the two conveying surfaces and feed it to the slicing unit by controlling the respective drives synchronously.

The additional deflection roller and the first drive roller are preferably arranged coaxially. This arrangement is particularly space-saving. The first conveying surface and the second conveying surface can therefore have the same length, in particular if the first deflection roller and the second deflection roller are also arranged coaxially. Machine components, such as a conveyor belt or a cutting edge, can be connected flush to both conveying lanes upstream and downstream.

Preferably, the first axis of the first drive roller and the second axis of the second drive roller are spaced from one another and are in particular disposed in parallel. If the first and the second axis are spaced from one another, the elements driving the drive rollers, such as the motor or the drive shaft, can also be arranged offset accordingly. Generally, an associated motor is disposed outside the region of the product feed, preferably in a machine housing at the side.

The structure of the product conveying apparatus can correspondingly be configured to be flexible. If the first and the second axis are parallel, other components, such as the deflection rollers and therefore the first and the second conveying surface, can also be aligned in parallel.

Preferably, a first drive for driving the first drive roller and a second drive for driving the second drive roller are provided, and the first drive and the second drive are arranged at the same side, in particular one that is lateral to a conveying direction of the product conveying apparatus. This allows the first and the second conveying lane to be operated independently of one another, in particular at different speeds. This is also particularly space-saving. It is particularly advantageous for the feed of cables and lines and enables in particular a bundled feed and encapsulation or enclosure at just one side, precisely this side. A lateral side can expediently be chosen for the drives, for example, a side disposed opposite a loading side or an operator side. This means that the drives and feed lines do not interfere with a conveying process, with cleaning or the activities of a machine operator.

Preferably, the product conveying apparatus is a product support, in particular a lower product support, preferably as part of a product feed. The product support can support the food products up to a cutting edge. In particular, it can ensure precise product advancement.

The product conveying apparatus is preferably an upper product feeder. It can press from above onto the food product, for example, a food bar, in order to thus control and precisely design product advancement.

Preferably, the first drive roller is connected to a drive by way of a detachable coupling. In this way, the first drive roller and in particular the first conveying lane including its other components can be removed. This means components can be exchanged or cleaned. The drive can also be exchanged.

Preferably, the first drive and/or the second drive is an electric motor, in particular a servo motor. Such a drive can be implemented having a compact design. The drives can be precisely controlled and their direction of motion can be reversed. Variants with sensors for feedback control are additionally possible.

Preferably, the first and/or the second drive is connected to the respective drive roller by way of an angular gear. The angular gear can curve the drive train, for example, at an angle of 90 degrees. Curving the drive train by an angle of up to 180 degrees is also conceivable. The angular gear can enable additional space saving, for example, in comparison to drives which only extend substantially along the drive axis.

Preferably, the first drive roller is connected to a first drive shaft in a detachable manner by way of a coupling. The drive shaft can be used to bridge additional distances which result from the arrangement of the components of the product conveying apparatus or a food slicing machine in which it is arranged. For example, the drives in the form of electric motors can be shielded from the conveying lanes by housings or protective walls.

By relaxing the second circulating conveying device, the additional deflection roller is preferably connected in a detachable manner to the second drive roller which is provided fixedly on a second drive shaft. The second conveying device can then be cleaned and removed if necessary. Likewise, other components, such as the second deflection roller and the additional deflection roller, can be cleaned and/or removed. It is also conceivable to exchange individual components, such as the conveying device, for other components with different properties. For example, conveying devices with different surface structures or with special material properties can be employed.

The second drive roller is preferably provided on a second drive shaft, where the second drive shaft is mounted in a support tube. The second drive shaft establishes the connection for power transmission to the drive of the second drive roller. The second drive roller can be positioned in dependence of the length of the drive shaft while maintaining a fixed length. A drive, for example, an electric motor, can be arranged according to the length of the drive shaft. The drive shaft can be mounted in the support tube expediently at several points of the drive shaft by way of bearings, for example, ball or rolling bearings, for example, in the vicinity of a first as well as a second longitudinal end. The drive shaft and the bearings in the support tube are protected against external influence.

The product conveying apparatus preferably comprises a lateral mounting plate on which the one or more drive shafts and/or the support tube are mounted. Stable anchoring is thus possible, where the mounting plate can be configured to be correspondingly torsion-resistant in order to absorb weight forces or bending forces which can arise, for example, when the conveying devices are tensioned.

The support tube is preferably screwed with a face side thread to the mounting plate. This means that the support tube can be easily exchanged and support tubes with different lengths can be used to match the corresponding drive shafts.

The support tube is preferably mounted on a cross member by way of a spacer element, where the spacer element is arranged in particular on a projecting end region of the support tube. It is also conceivable to arrange the spacer element in a central region of the support tube. The spacer element can ensure stable mounting so that the support tube does not bend or twist when respective forces are applied. The spacer element can ensure the stability of the support tube, in particular in combination with mounting of the support tube on the mounting plate. Positioning at a projecting end region of the support tube, which is the region of the longitudinal end facing away from the mounting plate, is expedient since this is where bending due to lateral forces is potentially the greatest. The cross member can be a stable component of any kind, suitable for absorbing or dissipating forces, for example, a stable metal sheet, C-profile or the like. The cross member can in turn be connected to the mounting plate. The cross member can be connected to a left-side and a right-side mounting plate.

The spacer element preferably has a screw connection which is suitable for adjusting a distance between the support tube and the cross member. In this way, a pretension on the support tube can be adjusted which, in conjunction with the bending force resulting from the tension of the second conveying device around the second drive roller, leads to a straight, unbent state of the support tube.

Preferably, a support element is provided between the first conveying lane and the second conveying lane and is supported on a carrier, in particular the support tube or the cross member. In this way, the conveying lanes that carry the weight of the food products can also transfer it and their own weight, and bending of the respective components, in particular the conveying surfaces, can be prevented.

The product conveying apparatus preferably comprises a third conveying lane, where the third conveying lane comprises a third deflection roller, a third drive roller, and a third circulating conveying device. The third circulating conveying device is guided around the third deflection roller and the third drive roller such that a third span extending from the third deflection roller to the third drive roller forms a third conveying surface. The third drive roller is drivable about a third axis. A third food product can then be conveyed to a slicing unit independently of the first and the second food product. The first conveying surface, the second conveying surface, and the third conveying surface can be coplanar.

Preferably the third axis is aligned with the first axis. The first conveying lane and the third conveying lane can be substantially symmetrical and arranged laterally to the right and left of the second, the center conveying lane. The conveying lanes can have substantially the same dimensions, in particular the same length in the conveying direction.

A third drive is preferably provided, and the third drive is arranged on the side of the product conveying apparatus that is disposed laterally opposite to the first drive and the second drive. The power transmission can therefore take place over a short distance. A guide for a drive shaft by way of a drive roller of the first or the second conveying lane, i.e. a hollow shaft, can be dispensed with.

The product conveying apparatus preferably comprises a fourth conveying lane, where the fourth conveying lane comprises a fourth deflection roller, a fourth drive roller, a fourth circulating conveying device and a second additional deflection roller. The fourth circulating conveying device is guided around the fourth deflection roller, the fourth drive roller, and the second additional deflection roller such that a fourth span extending from the fourth deflection roller to the second additional deflection roller forms a fourth conveying surface. The fourth drive roller is drivable about a fourth axis. A fourth food product can then be conveyed to a slicing unit independently of the first, the second, and the third food product.

The fourth axis is preferably aligned with the second axis. The dimensions and arrangements of the components of the fourth axis and the second axis can then be substantially the same. In particular, the fourth conveying surface and the second conveying surface can have the same dimensions. In this way, a substantially mirror-symmetrical arrangement with reference to a central axis in the conveying direction can be realized.

A fourth drive is preferably provided, and the fourth drive is arranged on the side of the product conveying apparatus that is disposed laterally opposite to the first drive and the second drive. In this way, the arrangement including the drives can also be realized in a substantially mirror-symmetrical manner with reference to a central axis in the conveying direction. The available space can be optimally utilized and the arrangement remains as simple as possible because hollow shafts can be dispensed with. The third drive and the fourth drive can be arranged on the same side.

The third axis of the third drive roller and the fourth axis of the fourth drive roller are preferably disposed in parallel. A drive shaft of the fourth drive roller can then also be guided past in parallel next to or under the third drive roller.

Preferably, the third drive roller is connected to a third drive shaft in a detachable manner by way of a coupling. Thus, the third drive roller and the remaining elements of the third conveying lane can be removed.

By relaxing the fourth circulating conveying device, the second additional deflection roller is preferably connected in a detachable manner to the fourth drive roller which is provided fixedly on a fourth drive shaft. It can thus be possible to remove the fourth conveying device. It can also be possible to remove the fourth deflection roller and the second additional deflection roller. It can be provided that the fourth conveying lane can be removed with the exception of the fourth drive roller.

The fourth drive roller is preferably provided on a fourth drive shaft, where the fourth drive shaft is mounted in a second support tube. The fourth drive roller can thus be positioned in accordance with the arrangement of the second conveying lane. Mounting in the second support tube stabilizes and protects the bearing.

The second drive roller and/or fourth drive roller is preferably arranged below the first and/or the third drive roller. The arrangement is particularly space-saving and a further conveying apparatus can adjoin the product conveying apparatus. In particular, a further conveying apparatus can adjoin at the level of the first and the third drive roller.

Preferably, the second and/or the fourth drive roller is arranged upstream of the first and/or the third deflection roller. The second and/or the fourth drive roller can be arranged both upstream as well as offset in height, in particular offset downwardly, from the first and/or the third deflection roller.

The first and/or the third conveying lanes preferably each form an outer conveying lane of the product conveying apparatus. These conveying lanes can therefore be driven by particularly short drive shafts. A compact arrangement of the product conveying apparatus can be achieved. It is also conceivable to connect the drive rollers of the first and the third conveying lanes directly to a gear or to the drive.

The circulating conveying devices are preferably straps or belts, in particular toothed belts, round belts, V-belts or flat belts. The drive rollers and/or the deflection rollers and/or the additional deflection rollers can comprise on their outer side a structuring that matches the respective belt, preferably a toothing, for engaging with the belt without slippage and for driving it or for being driven by it.

Preferably, the first, the second, the third, and/or the fourth conveying lane each comprise at least one further circulating conveying device. Two or more conveying devices can therefore be provided for every conveying lane. Due to the then preferably smaller width of the conveying devices, this can be advantageous when removing the conveying devices or enable a different contact surface for the food product with the conveying devices than in a variant with only one conveying device for every lane.

Preferably, the second conveying lane comprises at least one further circulating conveying device, where only the second circulating conveying device is guided around the second drive roller, and the at least one further circulating conveying device is guided only around the second deflection roller and the second additional deflection roller. This means that conveying devices of a standardized size can be employed at all conveying lanes, and only one conveying device is configured to drive the second conveying lane. Since the conveying device used for driving can be narrower than the width of the conveying lane, material saving is also possible. The drive roller then drives the second conveying device, which in turn drives the additional deflection roller, and the additional deflection roller in turn drives the at least one further conveying device.

Preferably, the fourth conveying lane comprises at least one further circulating conveying device, where only the fourth circulating conveying device is guided around the fourth drive roller, and the at least one further circulating conveying device is guided only around the fourth deflection roller and the second additional deflection roller. Like in the case of the second conveying lane, the drive roller can therefore drive the fourth conveying device, where the latter in turn drives the additional deflection roller and the latter in turn drives the at least one further conveying device.

The second drive roller preferably has a different axial length than the fourth drive roller. This means that conveying devices, in particular belts, are driven at different positions transverse to the conveying direction.

The second drive shaft of the second drive roller preferably has a different length than the fourth drive shaft of the fourth drive roller. This can also enable conveying devices to be driven at different positions transverse to the conveying direction.

Preferably, the position of the second drive roller is adjustable transverse to the direction of transport, in particular in that the drive roller is slidable on or with the second drive shaft. This means that conveying devices are driven at different positions. In particular, driving a conveying device can be ensured even if the lane set-up is changed.

The product conveying apparatus preferably comprises a belt cartridge and a belt cartridge receptacle, where the belt cartridge comprises the first conveying lane as well as the second deflection roller and the additional deflection roller of the second conveying lane, and where the belt cartridge receptacle comprises the second drive roller, and where the belt cartridge is arranged to be detachable in the belt cartridge receptacle. The components forming the conveying surfaces can therefore be easily exchanged. It is also conceivable to thus change the number of conveying lanes or the lane widths.

The invention additionally relates to a food slicing machine with a belt cartridge receptacle for receiving the belt cartridge of the product conveying apparatus according to the preceding paragraph. The food slicing machine comprises a first drive shaft which can be coupled to the first drive roller of the product conveying apparatus by way of a detachable coupling when the belt cartridge is arranged in the belt cartridge receptacle, and the food slicing machine comprises a second drive shaft on which the second drive roller of the product conveying apparatus remains when the belt cartridge is removed from the belt cartridge receptacle.

Preferably, the belt cartridge comprises the second circulating conveying device. The second conveying lane can therefore be completely removed, except for the second drive roller.

The product conveying apparatus is preferably configured as a belt cartridge which can be arranged to be detachable in a belt cartridge receptacle of a food slicing machine, where the first drive roller can be coupled in a detachable manner by way of a coupling to a first drive shaft of the food slicing machine, and where the second drive roller can be coupled in a detachable manner by way of a coupling to a second drive shaft of the food slicing machine.

The invention additionally relates to a food slicing machine for receiving a product conveying apparatus according to the preceding paragraph, where the food slicing machine comprises a first drive shaft which can be to the first drive roller of the product conveying apparatus coupled by way of a detachable coupling when the belt cartridge is arranged in the food slicing machine, and where the food slicing machine comprises a second drive shaft which can be coupled to the second drive roller of the product conveying apparatus by way of a detachable coupling when the belt cartridge is arranged in the food slicing machine.

The first drive shaft and the second drive shaft are preferably arranged at a distance from one another and in particular in parallel.

Preferably, the food slicing machine comprises a slicing unit for slicing a food product.

The invention additionally relates to a method for removing a belt cartridge from a food slicing machine, where the belt cartridge comprises a first conveying lane with a first deflection roller, a first drive roller, and a first circulating conveying device, and where the belt cartridge furthermore comprises a second conveying lane with a second deflection roller, an additional deflection roller, and a second circulating conveying device, the method comprising the following steps of:

- relaxing the second circulating conveying device by moving at least one of the second deflection roller and the additional deflection roller relative to a second drive roller,
- unhooking the second circulating conveying device from the second drive roller, and
- removing the belt cartridge from a belt cartridge receptacle.

The method steps can be carried out in particular in the aforementioned sequence.

The second drive roller preferably remains in the belt cartridge receptacle when the belt cartridge is removed.

The method preferably comprises, as a further method step, releasing a coupling between the first drive roller and a first drive shaft of the food slicing machine.

BRIEF DESCRIPTION OF THE DRAWINGS

Embodiments of the invention shall be described in more detail hereafter with reference to the figures, where.

Corresponding components are each provided with the same reference numerals in the figures.

DETAILED DESCRIPTION

Figure 1:
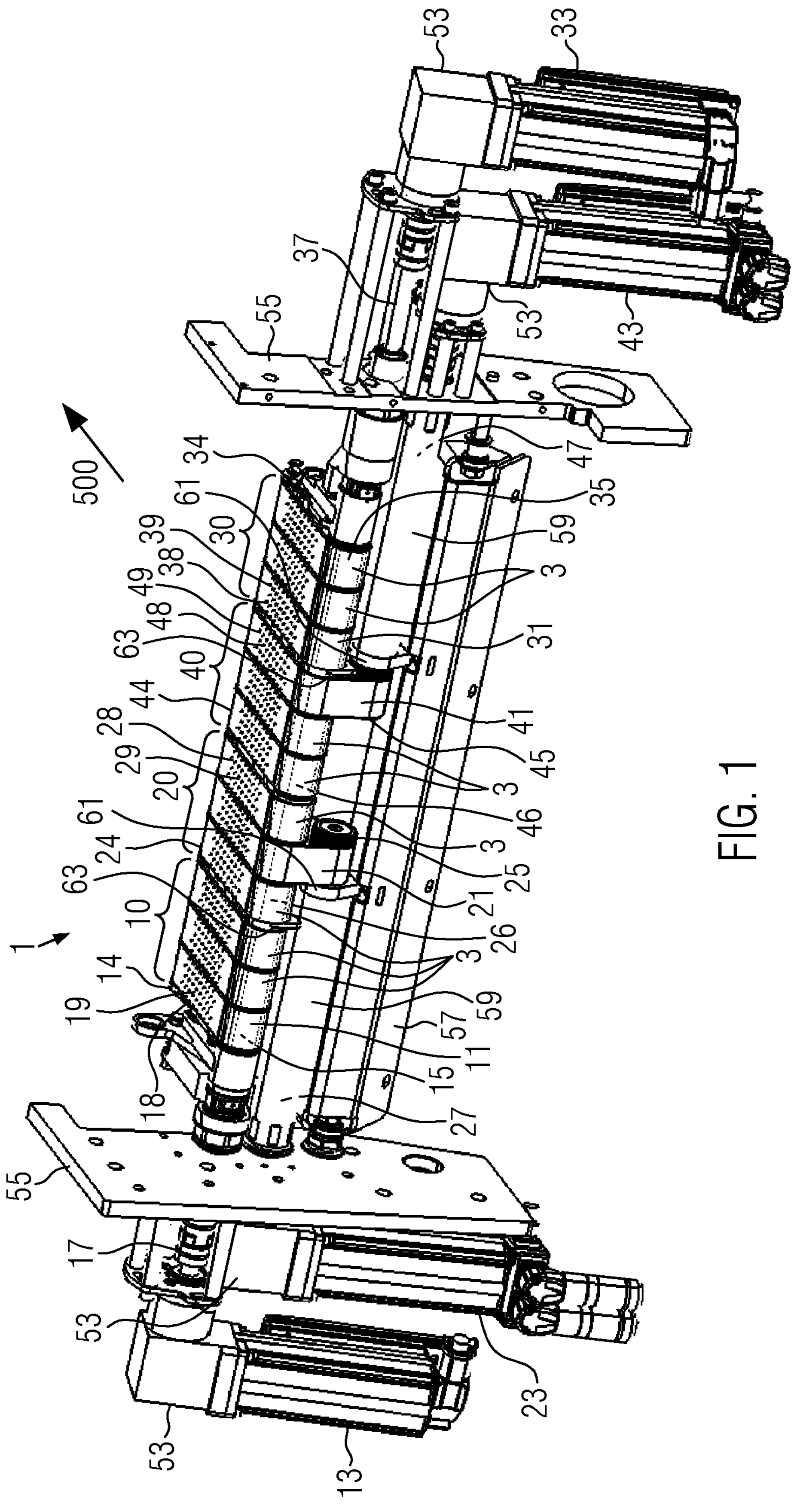
FIG. 1: shows a perspective view of a first embodiment of a product conveying apparatus with four conveying lanes.

FIG. 1 shows a first embodiment of a product conveying apparatus 1 in a perspective view, comprising a first conveying lane 10, a second conveying lane 20, a third conveying lane 30 and a fourth conveying lane 40. First conveying lane 10 comprises a first conveying device 11 as well as two further conveying devices 3. Second conveying lane 20 comprises a second conveying device 21 as well as two further conveying devices 3. Third conveying lane 30 comprises a third conveying device 31 as well as two further conveying devices 3. Fourth conveying lane 40 comprises a fourth conveying device 41 as well as two further conveying devices 3.

Conveying devices 11, 3 of first conveying lane 10 run around a first deflection roller 14 and a first drive roller 15 which are covered by three conveying devices 11, 3 in this illustration.

Conveying devices 21, 3 of second conveying lane 20 run around a second deflection roller 24 and a first additional deflection roller 26, where second deflection roller 24 and first additional deflection roller 26 are covered by the three conveying devices 11, 3 in this illustration. Second conveying device 21 additionally runs around second drive roller 25. Second drive roller 25 is disposed offset downwardly relative to first additional deflection roller 26.

Conveying devices 31, 3 of third conveying lane 30 run around a third deflection roller 34 and a third drive roller 35 which are covered by the three conveying devices 31, 3 in this illustration.

Conveying devices 41, 3 of fourth conveying lane 40 run around a fourth deflection roller 44 and a second additional deflection roller 46, where fourth deflection roller 44 and second additional deflection roller 46 are covered by the three conveying devices 41, 3 in this illustration. Fourth conveying device 41 additionally runs around fourth drive roller 45. Fourth drive roller 45 is disposed offset downwardly relative to second additional deflection roller 46.

A first drive shaft 17 connects first drive roller 15 to an angular gear 53 and a first drive 13.

A second drive shaft 27 connects second drive roller 25 to an angular gear 53 and a second drive 23.

A third drive shaft 37 connects third drive roller 35 to an angular gear 53 and a third drive 33.

A fourth drive shaft 47 connects fourth drive roller 45 to an angular gear 53 and a fourth drive 43.

Mounting plates 55 and a cross member 57 serve as support or fastening elements, respectively. Drive shaft 27 of second conveying lane 20 and drive shaft 47 of fourth conveying lane 40 are each mounted in a support tube 59. Support tubes 59 are each mounted on cross member 57 by way of a spacer element 61. Conveying lanes 10, 20, 30, 40 are mounted on support tubes 59 by way of two support elements 63. Product conveying apparatus 1 is expediently arranged in a food slicing machine such that a food product is fed to a slicing unit in a conveying direction 500. First conveying device 11 comprises an upper first span 18. First span 18 forms a first conveying surface 19. Second conveying device 21 comprises an upper second span 28. Second span 28 forms a second conveying surface 29. Third conveying device 31 comprises an upper third span 38. Third span 38 forms a third conveying surface 39. Fourth conveying device 41 comprises an upper fourth span 48. Fourth span 48 forms a fourth conveying surface 49. In this embodiment, the upper spans of further conveying devices 3 also contribute to conveying surfaces 19, 29, 39, 49. In embodiments in which there is only one conveying device present for every lane, accordingly only first conveying devices 11, 21, 31, 41 contribute to conveying surfaces 19, 29, 39, 49.

Figure 2:
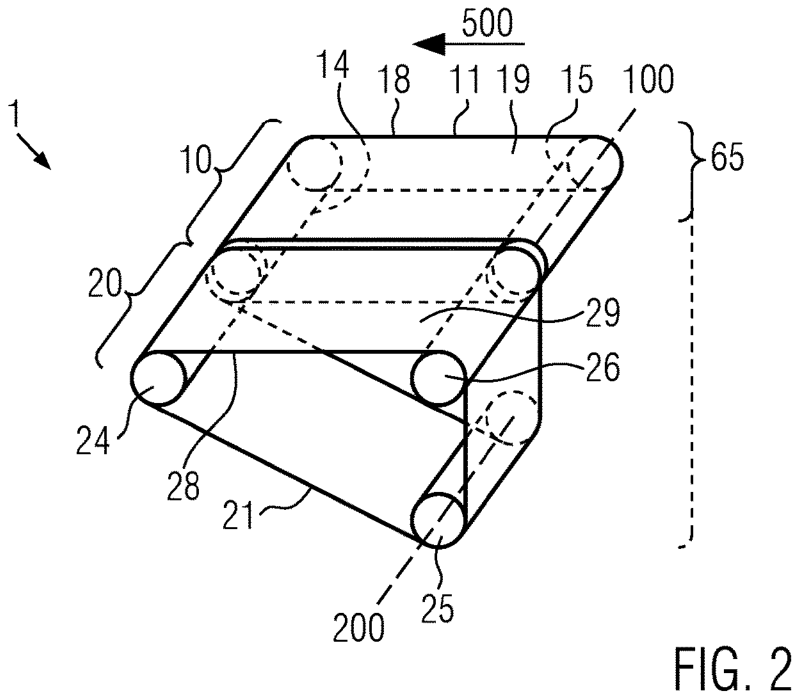
FIG. 2: shows a perspective view of a second embodiment of a product conveying apparatus with two conveying lanes.

FIG. 2 shows a perspective view of a second embodiment of a product conveying apparatus 1 with two conveying lanes 10, 20. Unlike FIG. 1, first conveying lane 10 is there arranged at the right side of second conveying lane 20. In addition, conveying lanes 10, 20 there each only comprise one conveying device 11, 21. First conveying lane 10 comprises a first deflection roller 14, a first drive roller 15, and a first conveying device 11. First conveying device 11 comprises an upper first span 18. First span 18 forms a first conveying surface 19.

Second conveying lane 20 comprises a second deflection roller 24, a second drive roller 25, a first additional deflection roller 26, and a second conveying device 21. Second conveying device 21 comprises an upper second span 28. Second span 28 forms a second conveying surface 29. Like in FIG. 1, product conveying apparatus 1 is arranged such that a food product is moved along conveying direction 500. Deflection rollers 14, 24 can therefore directly adjoin a cutting edge. First drive roller 15 is rotatable about a first axis 100 and second drive roller 25 is rotatable about a second axis 200. In this embodiment, first axis 100 is both the central axis of rotation of first drive roller 15 as well as of first additional roller 26. First conveying lane 10 as well as second deflection roller 24 and additional deflection roller 26 of second conveying lane 20 can be removable together as a belt cartridge 65 from product conveying apparatus 1 or from a food slicing machine, respectively. Second conveying device 21, like first conveying device 11, can be removed and therefore be part of belt cartridge 65. In a further embodiment, product conveying apparatus 1 including second drive roller 25 can be configured as a belt cartridge 65 and can be arranged to be detachable in a belt cartridge receptacle of a food slicing machine.

Figure 3:
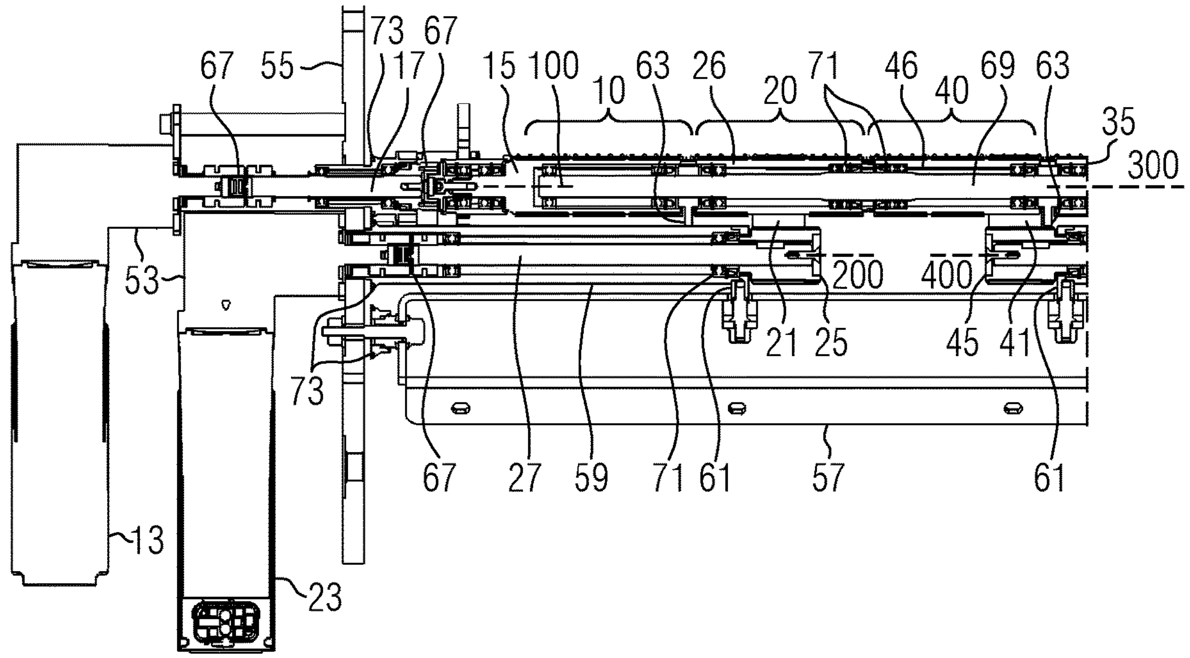
FIG. 3: shows a sectional view of a left side of the first embodiment of the product conveying apparatus.

FIG. 3 shows a sectional view of a left side of the first embodiment according to FIG. 1 of the product conveying apparatus 1. A coupling 67 connects first drive shaft 17 to first drive roller 15. A coupling 67 additionally connects first drive shaft 17 to an angular gear 53. A coupling 67 connects second drive shaft 27 to an angular gear 53. First additional deflection roller 26 is mounted to be freely rotatable on a rod 69 and is driven by second drive roller 25 by way of second conveying device 21. Second additional deflection roller 46 is mounted to be freely rotatable on rod 69 and is driven by fourth drive roller 45 by way of fourth conveying device 41. Support tubes 59 are each mounted on cross member 57 by way of spacer element 61. Support elements 63 support conveying lanes 10, 20, 30, 40 on support tubes 59. Ball bearings 71 are used to mount the rotating elements. Mounting plate 55 is used for mechanical fixation, where a housing wall can be arranged between mounting plate 55 and seals 73 in order to position drives 13, 23 outside a machine housing and to position the remaining components within the machine housing.

First drive roller 15 is rotatable about a first axis 100, second drive roller 25 is rotatable about a second axis 200, third drive roller 35 is rotatable about a third axis 300, and fourth drive roller 45 is rotatable about a fourth axis 400. First axis 100 and third axis 300 are aligned in this embodiment. Second axis 200 and fourth axis 400 are likewise aligned in this embodiment.

Figure 4:
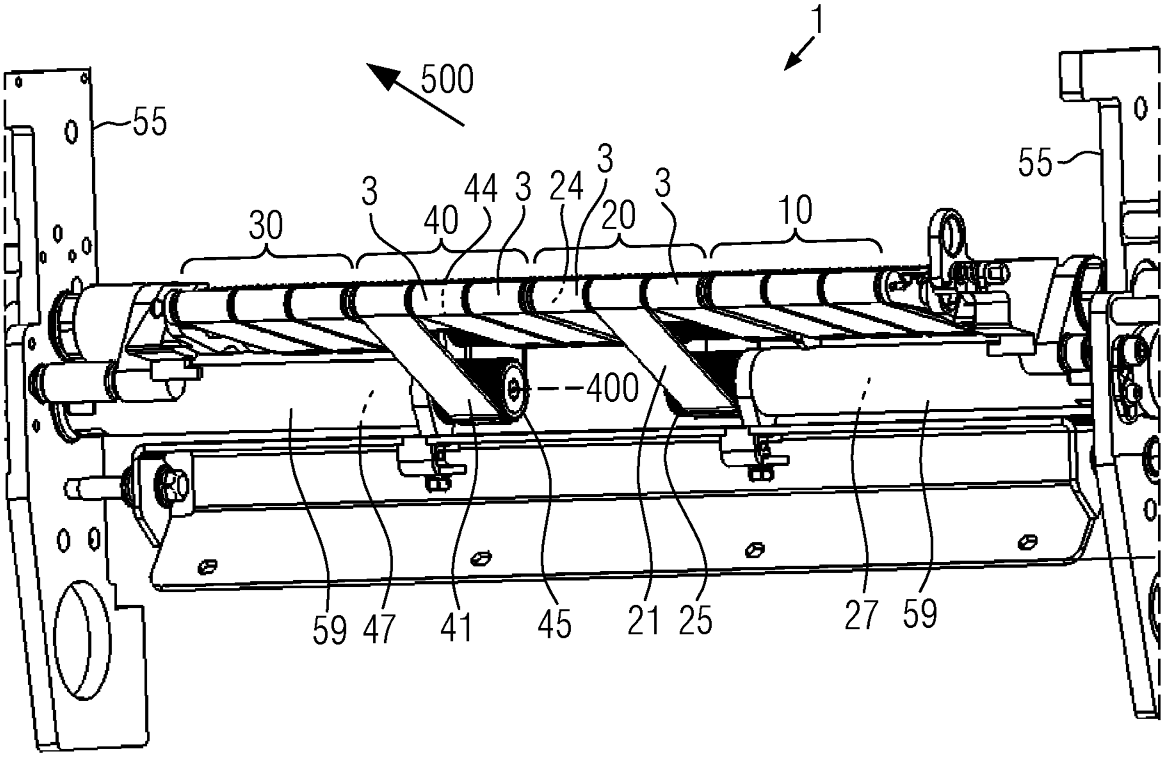
FIG. 4: shows a perspective view of the first embodiment of the product conveying apparatus.

FIG. 4 shows a perspective view of the first embodiment of product conveying apparatus 1 according to FIG. 1 in an orientation rotated by approximately 180 degrees and thus with a perspective opposite to conveying direction 500. Second drive roller 25 drives second conveying device 21 such that second conveying device 21 drives second deflection roller 24, and second deflection roller 24 in turn drives further conveying devices 3. Entire second conveying lane 20, which in this embodiment comprises three conveying devices 21, 3, is then driven. Likewise, fourth drive roller 45 drives fourth conveying device 41 such that fourth conveying device 41 drives fourth deflection roller 44, and fourth deflection roller 44 in turn drives further conveying devices 3. Drive shaft 27 of second conveying lane 20 and drive shaft 47 of fourth conveying lane 40 are each mounted in a support tube 59.

Figure 5:
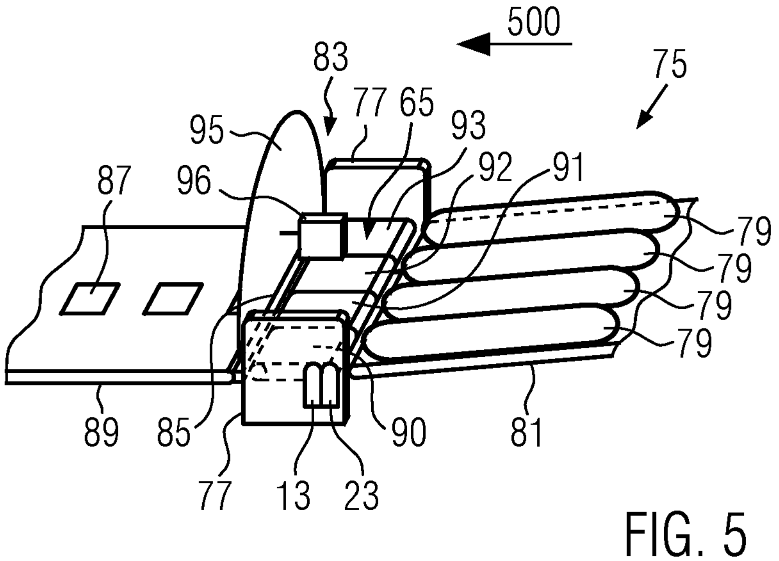
FIG. 5: shows a schematic view of a food slicing machine.

FIG. 5 shows a schematic view of a food slicing machine 75 with a belt cartridge 65 in a belt cartridge receptacle 77. Belt cartridge 65 comprises four independent conveying lanes 90, 91, 92, 94. A food product 79 is fed to belt cartridge 65 in conveying direction 500 by way of a feed conveyor 81 arranged as a product conveyor belt upstream of belt cartridge 65 in order to then be fed from belt cartridge 65 to a slicing unit 83. For this purpose, belt cartridge 65 reaches up to a cutting edge 85. Slicing unit 83 comprises a cutting knife 95 and a cutting knife drive 96 which drives cutting knife 90 so that cutting knife 95 rotates relative to cutting edge 85 and slices product slices 87 off from food products 79 that are supplied in parallel. Due to the independent drive of conveying lanes 90, 91, 92, 94, slices of different thicknesses can be sliced off in each lane. Product slices 87 sliced off from food product 79 are then fed to further processing stations by a discharge conveyor 89 as a portioning belt. Belt cartridge receptacle 77 can be formed by mounting plates 55 and comprise a left and right element, where belt cartridge 65 can be arranged to be detachable in belt cartridge receptacle 77 by way of couplings 67, as shown in FIG. 3.

The invention claimed is:

1. A product conveying apparatus for feeding food products to a slicing unit of a food slicing machine, comprising:

a first conveying lane, comprising:

a first deflection roller;

a first drive roller drivable about a first axis;

a first circulating conveying device guided around the first deflection roller and the first drive roller and presenting a first conveying surface extending from the first deflection roller to the first drive roller;

a second conveying lane, comprising:

a second deflection roller and an additional deflection roller;

a second drive roller drivable about a second axis;

a second circulating conveying device guided around the second deflection roller, the additional deflection roller, and the second drive roller and presenting a second conveying surface extending from the second deflection roller to the additional deflection roller; and a third conveying lane, comprising:

a third deflection roller;

a third drive roller drivable about a third axis; and a third circulating conveying device guided around the third deflection roller and the third drive roller and presenting a third conveying surface extending from the third deflection roller to the third drive roller;

wherein the first conveying lane, the second conveying lane, and the third conveying lane are arranged in parallel; and wherein the additional deflection roller and the first drive roller are arranged coaxially.

2. The product conveying apparatus of claim 1, wherein the first conveying surface and the second conveying surface are coplanar.

3. The product conveying apparatus of claim 1, wherein the first axis of the first drive roller and the second axis of the second drive roller are spaced from one another and are disposed in parallel.

4. The product conveying apparatus of claim 1, further comprising:

a first drive for driving the first drive roller; and a second drive for driving the second drive roller, wherein the first drive and the second drive are arranged at a same side that is lateral to a conveying direction of the product conveying apparatus.

5. The product conveying apparatus of claim 1, wherein the first drive roller is removably couplable to a first drive shaft.

6. The product conveying apparatus of claim 1, wherein, by relaxing the second circulating conveying device, the additional deflection roller is detachably connected to the second drive roller, which is provided fixedly on a second drive shaft.

7. The product conveying apparatus of claim 1, wherein the second drive roller is provided at a second drive shaft, wherein the second drive shaft is mounted in a support tube.

8. The product conveying apparatus of claim 1, further comprising:

a fourth conveying lane, comprising:

a fourth deflection roller and a second additional deflection roller;

a fourth drive roller drivable about a fourth axis;

a fourth circulating conveying device guided around the fourth deflection roller, the fourth drive roller, and the second additional deflection roller, and presenting a fourth conveying surface extending from the fourth deflection roller to the second additional deflection roller.

9. The product conveying apparatus of claim 1, wherein the second conveying lane comprises at least one further circulating conveying device, wherein only the second circulating conveying device is guided around the second drive roller, and wherein the at least one further circulating conveying device is guided only around the second deflection roller and the additional deflection roller.

10. The product conveying apparatus of claim 1, further comprising:

a belt cartridge comprising the first conveying lane, the second deflection roller, and the additional deflection roller of the second conveying lane; and a belt cartridge receptacle comprising the second drive roller, wherein the belt cartridge is arranged in a detachable manner in the belt cartridge receptacle.

11. A food slicing machine, comprising:

a first conveying lane, comprising:

a first deflection roller;

a first drive roller drivable about a first axis; and a first circulating conveying device guided around the first deflection roller and the first drive roller and presenting a first conveying surface extending from the first deflection roller to the first drive roller;

a second conveying lane, comprising:

a second deflection roller and an additional deflection roller;

a second drive roller drivable about a second axis; and a second circulating conveying device guided around the second deflection roller, the additional deflection roller, and the second drive roller and presenting a second conveying surface extending from the second deflection roller to the additional deflection roller;

a third conveying lane, comprising:

a third deflection roller;

a third drive roller drivable about a third axis;

a third circulating conveying device guided around the third deflection roller and the third drive roller and presenting a third conveying surface extending from the third deflection roller to the third drive roller;

wherein the first conveying lane, the second conveying lane, and the third conveying lane are arranged in parallel;

a belt cartridge comprising the first conveying lane, the second deflection roller, and the additional deflection roller of the second conveying lane;

a belt cartridge receptacle comprising the second drive roller;

a first drive shaft coupled to the first drive roller via a detachable coupling when the belt cartridge is arranged in the belt cartridge receptacle;

a second drive shaft on which the second drive roller remains when the belt cartridge is removed from the belt cartridge receptacle; and wherein the additional deflection roller and the first drive roller are arranged coaxially.

12. The food slicing machine of claim 11, wherein the first drive shaft and the second drive shaft are arranged in parallel.

13. The food slicing machine of claim 11, wherein the first axis and the third axis are coaxial, wherein the second axis is offset from the first axis and the third axis.

14. The food slicing machine of claim 11, further comprising a slicer for slicing food products, wherein the belt cartridge is adjacent a cutting edge of the slicer.

* * * * *